US012570471B2

(12) United States Patent
Asplund et al.

(10) Patent No.: US 12,570,471 B2
(45) Date of Patent: Mar. 10, 2026

(54) AUTOMATED BIN STORAGE

(71) Applicant: Finmatec Oy Ab, Kokkola (FI)

(72) Inventors: Anders Asplund, Kokkola (FI); Ville Jutila, Kokkola (FI)

(73) Assignee: FINMATEC OY AB, Kokkola (FI)

( * ) Notice: Subject to any disclaimer, the term of this patent is extended or adjusted under 35 U.S.C. 154(b) by 337 days.

(21) Appl. No.: 18/140,867

(22) Filed: Apr. 28, 2023

(65) Prior Publication Data

US 2023/0348189 A1 Nov. 2, 2023

(30) Foreign Application Priority Data

Apr. 29, 2022 (FI) .................................... 20225365

(51) Int. Cl.
| | |
|---|---|
| B65G 1/06 | (2006.01) |
| B65G 1/04 | (2006.01) |
| B65G 1/133 | (2006.01) |

(52) U.S. Cl.
CPC ........... B65G 1/065 (2013.01); B65G 1/0492 (2013.01); B65G 1/133 (2013.01); B65G 2201/0235 (2013.01)

(58) Field of Classification Search
None
See application file for complete search history.

(56) References Cited

U.S. PATENT DOCUMENTS

| | | | | |
|---|---|---|---|---|
| 6,213,025 | B1 | 4/2001 | Saierwein et al. | ...... B61B 13/04 |
| 9,630,774 | B2 * | 4/2017 | Traversa | .............. B65G 1/0414 |

(Continued)

FOREIGN PATENT DOCUMENTS

| | | | | |
|---|---|---|---|---|
| EP | 2994400 B1 | 1/2014 | .............. | B65G 1/06 |
| JP | S48-17866 | 2/1973 | | |

(Continued)

OTHER PUBLICATIONS

BR100 Eurobin racking specification sheet, from https://www.syspal.com/pdfs/spec-sheets/br100_specification_sheet.pdf, dated Sep. 2015 (Year: 2015).*

(Continued)

*Primary Examiner* — Mark C Hageman
(74) *Attorney, Agent, or Firm* — Nixon & Vanderhye PC

(57) ABSTRACT

An automated storage comprising a storage rack configured to store storage bins, a self-propelled shuttle vehicle configured to move along the first horizontal direction of the storage rack, a self-propelled satellite vehicle configured to be carriable by the self-propelled shuttle vehicle and configured to move along the second horizontal direction of the storage rack essentially perpendicular against the first horizontal direction, wherein the self-propelled satellite vehicle is configured to carry storage bin between the self-propelled shuttle vehicle and the storage position; wherein the self-propelled satellite vehicle comprises at least one groove on the top surface of the self-propelled satellite vehicle, a pair of mutually facing guides along the second horizontal direction wherein the self-propelled satellite vehicle is configured to move on top of the pair of mutually facing guides, a pair of mutually facing bars along the second horizontal direction essentially above the said pair of mutually facing guides wherein the storage bin is to be placed on top of the pair of mutually facing bars by the lifting lugs of the storage bin.

10 Claims, 10 Drawing Sheets

(56)            References Cited

U.S. PATENT DOCUMENTS

| 9,850,066 | B2 * | 12/2017 | Salichs | ................ | B65G 1/0492 |
| 11,214,439 | B2 * | 1/2022 | Knepp | ................ | B65G 1/1375 |
| 2019/0129371 | A1 * | 5/2019 | Wagner | ................ | G05D 1/0287 |
| 2019/0291955 | A1 | 9/2019 | Bastian, II | ........... | B65G 1/1375 |
| 2022/0297942 | A1 * | 9/2022 | Velagapudi | .......... | B65G 1/0492 |

FOREIGN PATENT DOCUMENTS

| JP | 05-319575 A | 12/1993 | ............. | B65G 59/02 |
| WO | 2013/075076 A1 | 5/2013 | ............... | B65G 1/06 |
| WO | 2013/075077 A1 | 5/2013 | ............... | B65G 1/06 |

OTHER PUBLICATIONS

SYSPAL Eurobin storage racking page from https://web.archive.org/web/20170429061405/https://www.syspal.com/eurobin-storage.html, dated Apr. 29, 2017. (Year: 2017).*
Oct. 5, 2023 Search Report issued in European Patent Application No. 23168914.2, pp. 1-7.

* cited by examiner

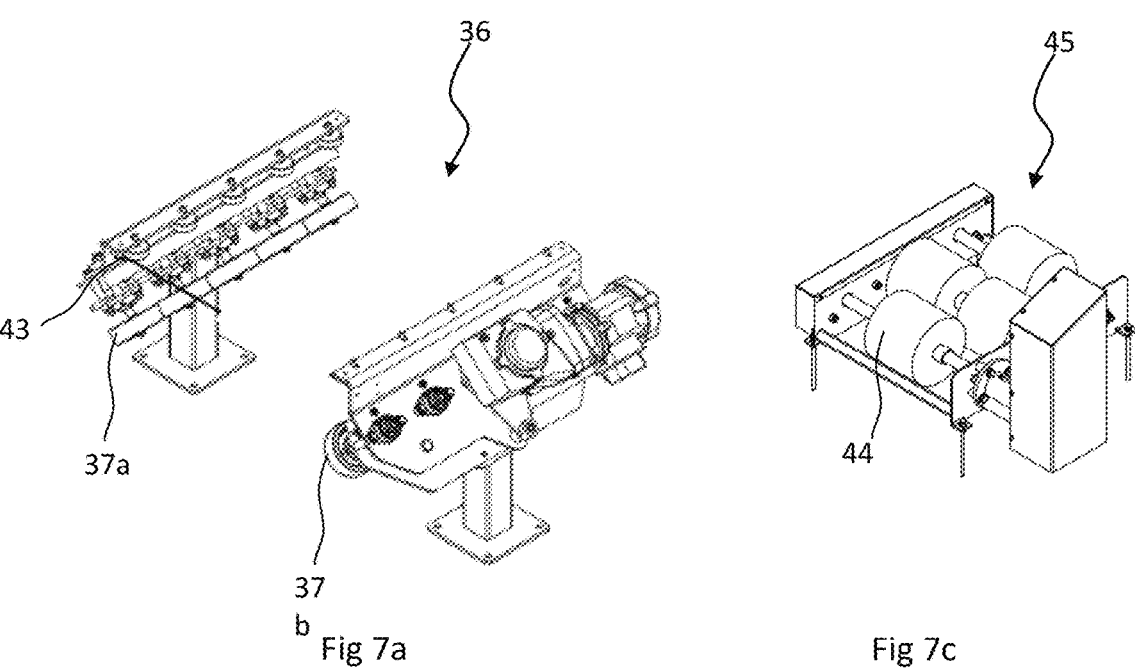
Fig 7a
Fig 7c
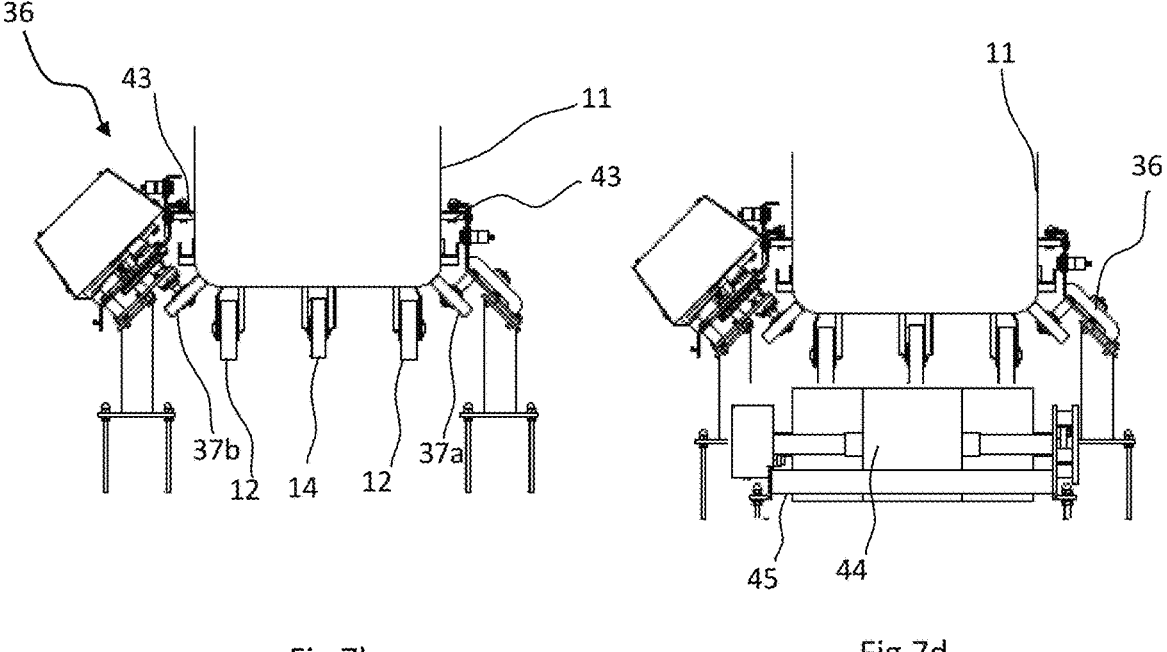
Fig 7b
Fig 7d

AUTOMATED BIN STORAGE

FIELD OF THE INVENTION

The invention relates to storing bins containing meat or poultry or liquid material in intermediate storage—especially in cold and hygienic storage—in food production before further processing and packaging.

BACKGROUND OF THE INVENTION

In high-volume food production, the amount of raw material processed is high and has to be managed as an industrial process. For example, the processing of raw meat requires strict conditions with respect to stability of temperature, cleanliness and timeliness. The status of each production lot has to be known accurately, and the conditions maintained stable throughout the whole process. High production volumes can be achieved by automation. The problem in high-volume production with a number of different articles of meat is how to manage the volumes and store intermediate products in an efficient manner and at the same time maintain the strict requirements of temperature, cleanliness and timeliness.

U.S. 62/135,025B1 discloses an automated storage, which comprises a storage rack and a self-propelled carrier vehicle to move along a first travel path in the storage rack and to transfer a self-propelled satellite vehicle, which can move along a second travel path crosswise to the first travel path.

20 US2019291955A1 discloses an automated storage, which comprises a vehicle to move along storage shelves.

JPH05319575 discloses a discloses a storage bin with lifting lugs.

BRIEF DESCRIPTION OF THE INVENTION

An object of the present invention to provide an apparatus for implementing the method so as to overcome the above. The objects of the invention are achieved by a method and an arrangement which are characterized by what is stated in the independent claims. The preferred embodiments of the invention are disclosed in the dependent claims.

The invention is based on the idea of a dense storage solution, where fixed size bins can be stored and retrieved in a desired order from an automated storage. A dense implementation of the storage enables maintaining strict cooling and temperature variation requirements for the stored material.

A typical storage item used if processing of meat is a Eurobin (or Euro bin) type of bin. The bins may also be referred as tote bins or meat cart in different markets. The bins typically have e.g. 2001 or 3001 capacity in volume, but also other capacity in volume is used. It is basically a bin with essentially equal width and length and provided with wheels in a special arrangement so that it can be easily moved and turned. The height of the bin varies depending on the volume and capacity of the bin.

The automated storage may also be configured to store Dolav type storage items or box palette.

The automated bin storage stores bins in a dense arrangement in a storage rack next to each other in adjacent first aisles and in multiple levels above each other. The first aisles of the rack are equipped with bars that are used to store that storage bins. The bins are moved by special self-propelled vehicles called satellite vehicles in the first aisles. The satellite vehicles carrying the storage bins are moved by self-propelled vehicles called shuttle vehicles in second aisles which are perpendicular against the first aisles. The bins are lifted to the target level in the rack by a lifting device. The automated storage can also be equipped with bin hoist, a buffer conveyor and a turntable to link the storage to production process of the production system. The automated storage comprises also a control system to identify, weigh, store and retrieve each bin, so that the control system has real-time and up to date status information of materials stored in the automated storage.

The automated storage is manufactured from stainless, non-corroding steel to enable high-pressure washing and maintaining the hygiene requirements.

BRIEF DESCRIPTION OF THE DRAWINGS

In the following the invention will be described in greater detail by means of preferred embodiments with reference to the attached drawings, in which

FIGS. 7a and 7b illustrate the buffer conveyor;

FIG. 7c illustrates the brush system;

FIG. 7d illustrates the brush system placed with the buffer conveyor;

DETAILED DESCRIPTION OF THE INVENTION

Figure 1A:
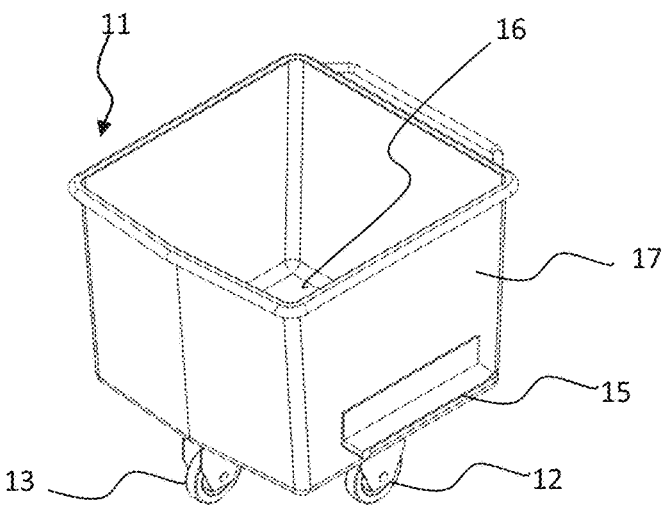
FIGS. 1a, 1b and 1c illustrate a typical storage bin.
Figure 1B:
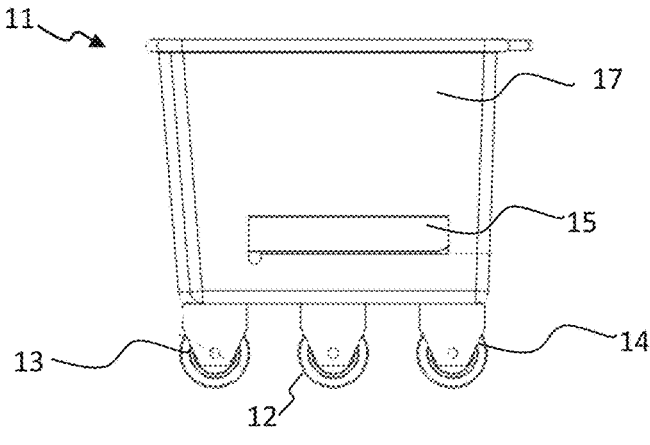
Figure 1C:
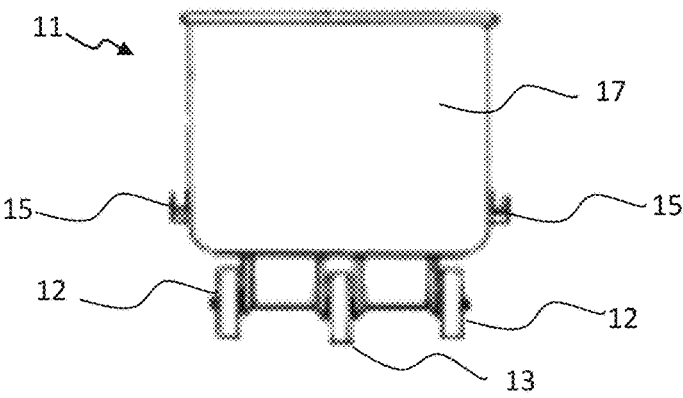

FIGS. 1a, 1b and 1c are illustrating storage bins 11 of various types. For example, a Eurobin type of storage bin used for hygiene-critical applications e.g. to store meat. The example of the FIG. 1b is a 2001 storage bin 11, which has a floor 16, walls 17, four wheels in a diamond formation, so that two parallelly fixed oriented wheels 12 are placed alongside one horizontal centre line of the storage bin 11, and two successively fixed wheels 13, 14 are placed alongside the second horizontal centre line of the storage bin 11, plus lifting lugs 15 on two opposite sides of the storage bin for lifting the storage bin 11. The parallelly fixed wheels 12 are configured to be approximately 2 cm further in distance from the floor 16 of the storage bin 11 compared to two successively fixed wheels 13,14. The storage bin 11 maybe equipped also with a hood to protect content of the storage bin 11. The storage bin 11 maybe equipped also with contactless identification e.g. RFID identifier or 2D or 3D bar code to enable unambiguous identification of storage bins.

Figure 2A:
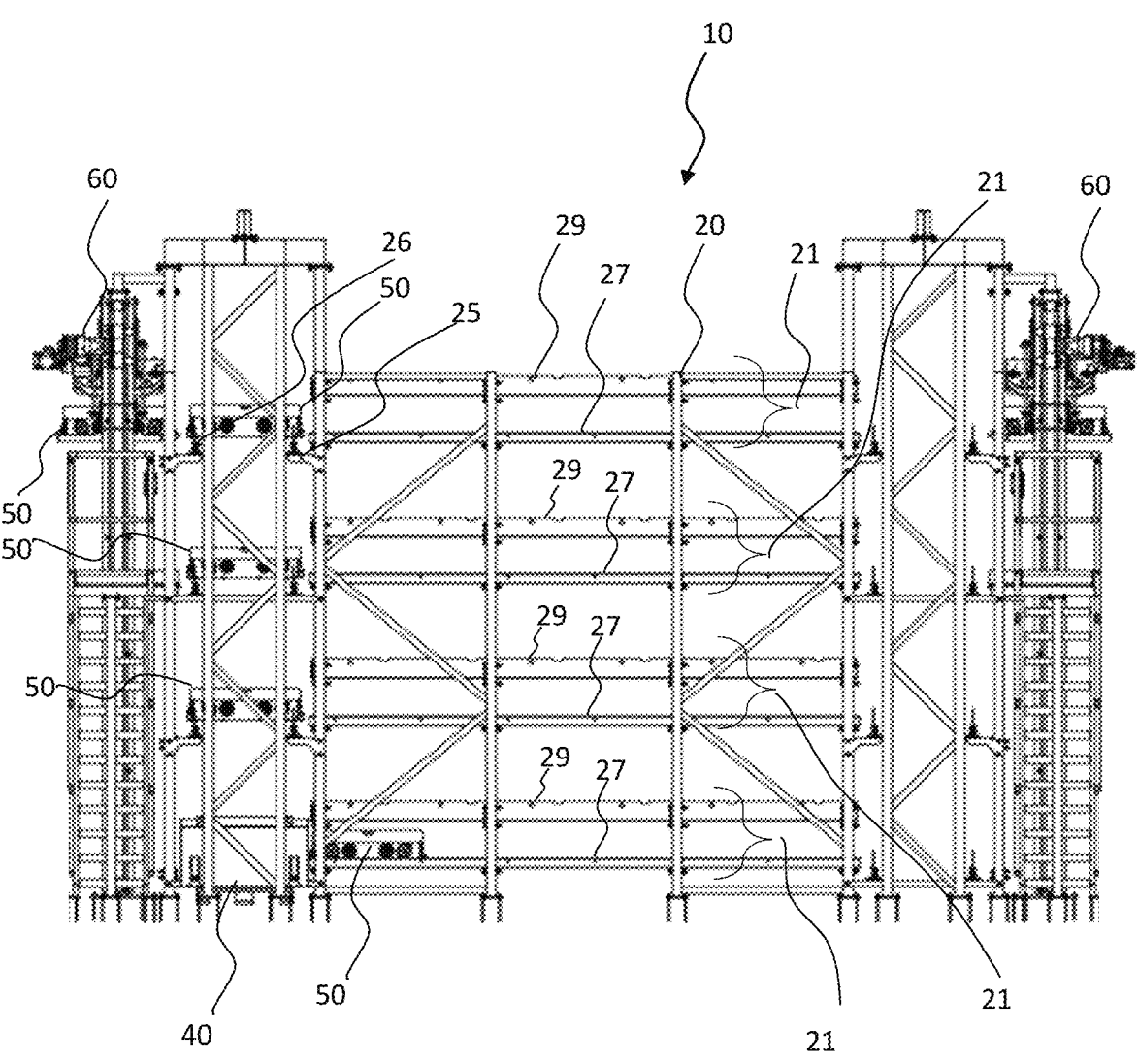
FIGS. 2a and 2b illustrate an automated storage.
Figure 2B:
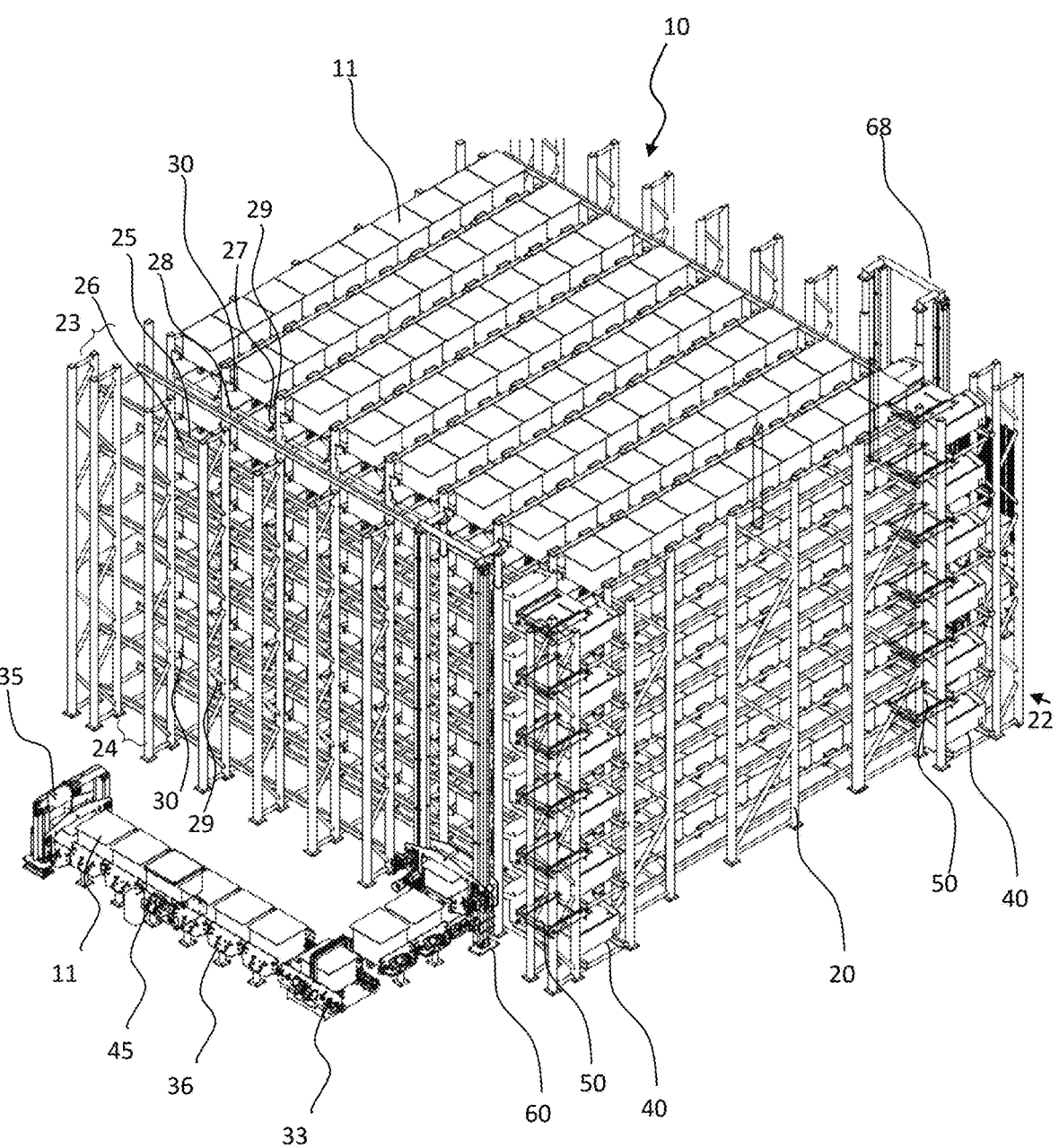

Referring to FIGS. 2a and 2b, the automated storage 10 comprises a storage rack 20 with multiple levels, in the example of FIG. 2b five levels 21. On each level 21 there is a pair of mutually facing horizontal guides 25, 26 in one horizontal direction. A self-propelled shuttle vehicle 40 is configured to move along the second aisle 23 on the pair of mutually facing guides 25, 26 and to carry a self-propelled satellite vehicle 50 and to stop at any of the first aisles 24 of the storage rack 20 so that the self-propelled satellite vehicle 50 can enter to any of the first aisles 24 of the storage rack 20. Each first aisle 24 comprises a pair of mutually facing guides 27, 28, wherein the self-propelled satellite vehicle 50 is configured to move and carry the storage bin 11 to a storage location. Each first aisle 24 further comprises a pair of bars 29, 30 on both sides of the first aisle 24 and above the pair of mutually facing guides 27, 28, respectively, and the bars 29, 30 are configured to store the storage bins 11. The storage bin 11 is placed on the mutually facing bars 29,30 by the lifting lugs 15 of the storage bin 11. A lifting device 60 is configured at least on one side of the storage rack 20, in this example on two sides of the storage rack 20.

Figure 3A:
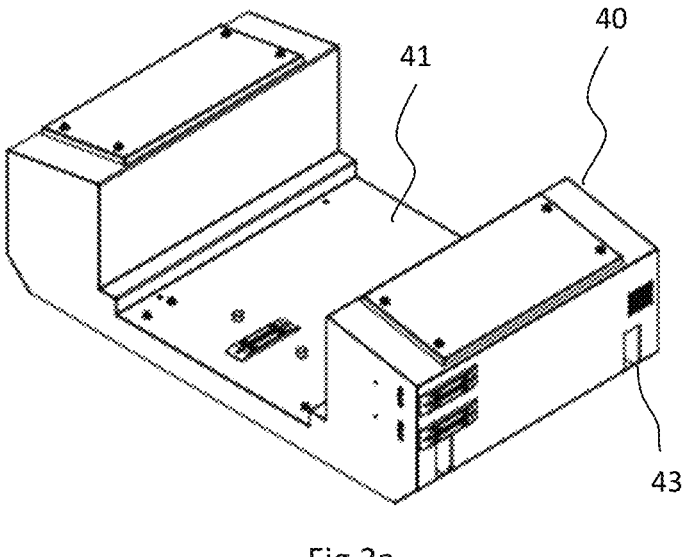
FIGS. 3a and 3b illustrate a self-propelled shuttle vehicle.
Figure 3B:
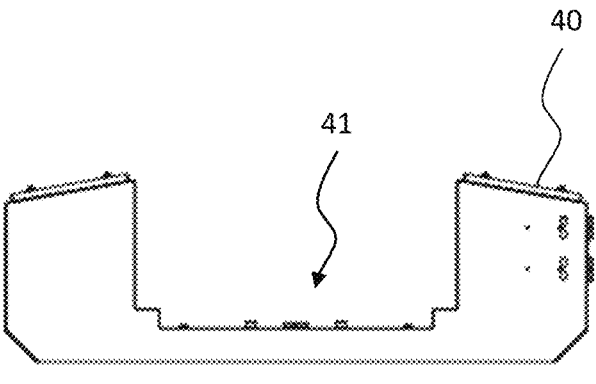

Referring to FIGS. 3*a* and 3*b*, the automated storage 10 comprises at least one self-propelled shuttle vehicle 40 on each level 21 of the storage rack 20 to move along the second aisle 23. The self-propelled shuttle vehicle 40 comprises a seat 41 to accommodate a self-propelled satellite vehicle 50. The self-propelled shuttle vehicle 40 comprises wireless communication to receive control information from the control system 31 and to transmit status information to the control system 31. The self-propelled shuttle vehicle 40 may be battery powered and may be charged at specific charging station 39 in each level of the storage rack 20. The self-propelled shuttle vehicle 40 further comprises a positioning system, which maybe based e.g., on optical sensors, which are able to detect markers e.g. 2D or 3D bar codes in the storage rack 20. The markers maybe e.g. placed between the mutually facing guides and they may be manufactured of stainless steel to be washable with pressure washer. The self-propelled shuttle vehicle 40 may be dampproof and washable with pressure washer.

Figure 4A:
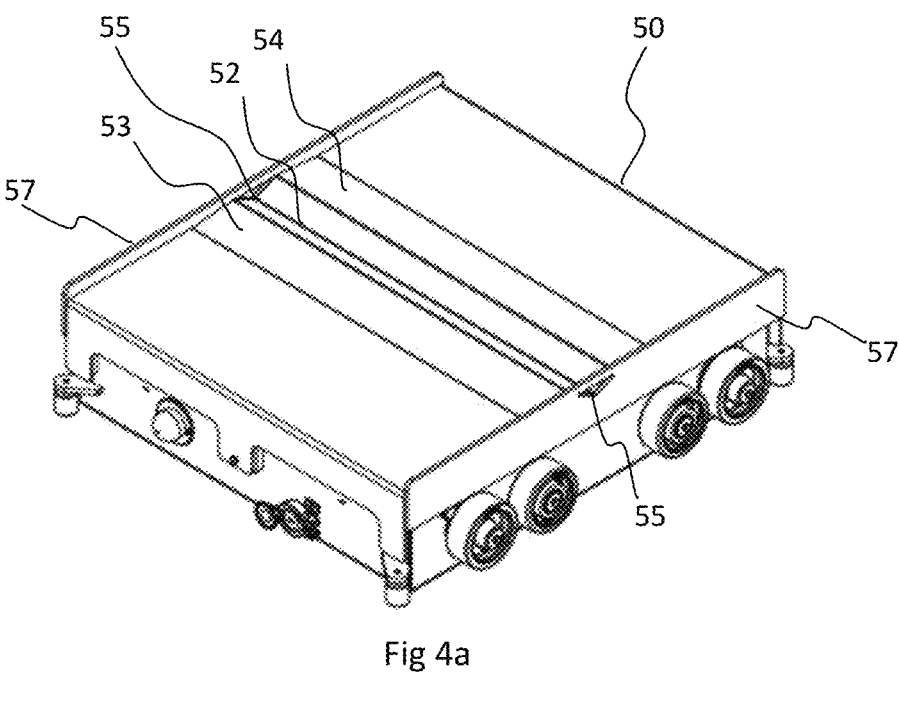
FIGS. 4a, 4b and 4c illustrate a self-propelled satellite vehicle.
Figure 4B:
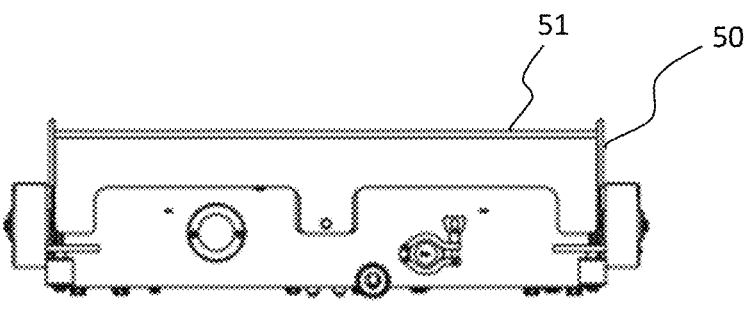
Figure 4C:
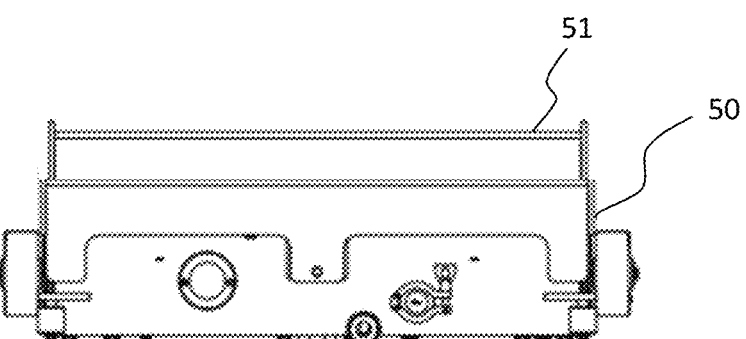

Referring to FIGS. 4*a*, 4*b* and 4*c*, the automated storage 10 comprises at least one self-propelled satellite vehicle 50. According to another embodiment of the invention, the automated storage 10 comprises a self-propelled satellite vehicle 50, wherein the top surface 51 of the satellite vehicle comprises a groove 52 essentially in the middle of top surface 51 o the self-propelled satellite vehicle 50 perpendicularly to the direction of motion of the self-propelled satellite vehicle 50. The storage bin 11 is to be placed on the top of the self-propped satellite vehicle 50 so that the parallelly fixed wheels 12 of the storage bin 11 are set to the groove 52.

The self-propelled satellite vehicle 50 may comprise a first raised section 53 on one side of said groove 52 and a second raised section 54 on second side of said groove 52. The storage bin 11 is to be placed on the top of the self-propped satellite vehicle 50 so that the parallelly fixed wheels 12 of the storage bin 11 are set to the groove 52, and first of the successively fixed wheel 13 of the storage bin 11 is set on one side of said first raised section 53 away from the said groove 52 and the second of the successively fixed wheels 14 of the storage bin 11 is set one side of said second raised section 54 away from said groove 52. Thus, the said groove 52 and also the said first and second raised sections 53, 54 prevent the storage bin 11 from rolling away. The self-propelled satellite vehicle 50 may comprise a hole 55 at least at one end of the groove 52 in the side wall 57 of the self-propelled satellite vehicle 50 to enable washing of the groove 52 by enabling draining of washing water via the hole 55. Referring to FIG. 4*c* the self-propelled satellite vehicle 50 is capable of raising its top surface 51 and carrying the storage bin 11. The self-propelled satellite vehicle 50 comprises wireless communication to receive control information from the control system 31 and to transmit status information to the control system 31. The self-propelled satellite vehicle 50 may be battery powered and may be charged at specific charging station in each level of the storage rack 20. The self-propelled satellite vehicle 50 further comprises a positioning system to identify storage positions at the first aisle 24. The positioning maybe based e.g. on pulse meter or counter or on optical sensors, which are able to detect markers e.g. 2D or 3D bar codes in the storage rack 20. The markers maybe e.g. placed between the mutually facing guides and they may be manufactured of stainless steel to be washable with pressure washer. The self-propelled satellite vehicle 50 may be dampproof and washable with pressure washer. The self-propelled satellite vehicle 50 may also be configured to operate in moving operations from and to the buffer conveyor 36, from and to the turn table 70 and from and to the lifting device 60 on the floor level of the automated storage 10.

Figure 5:
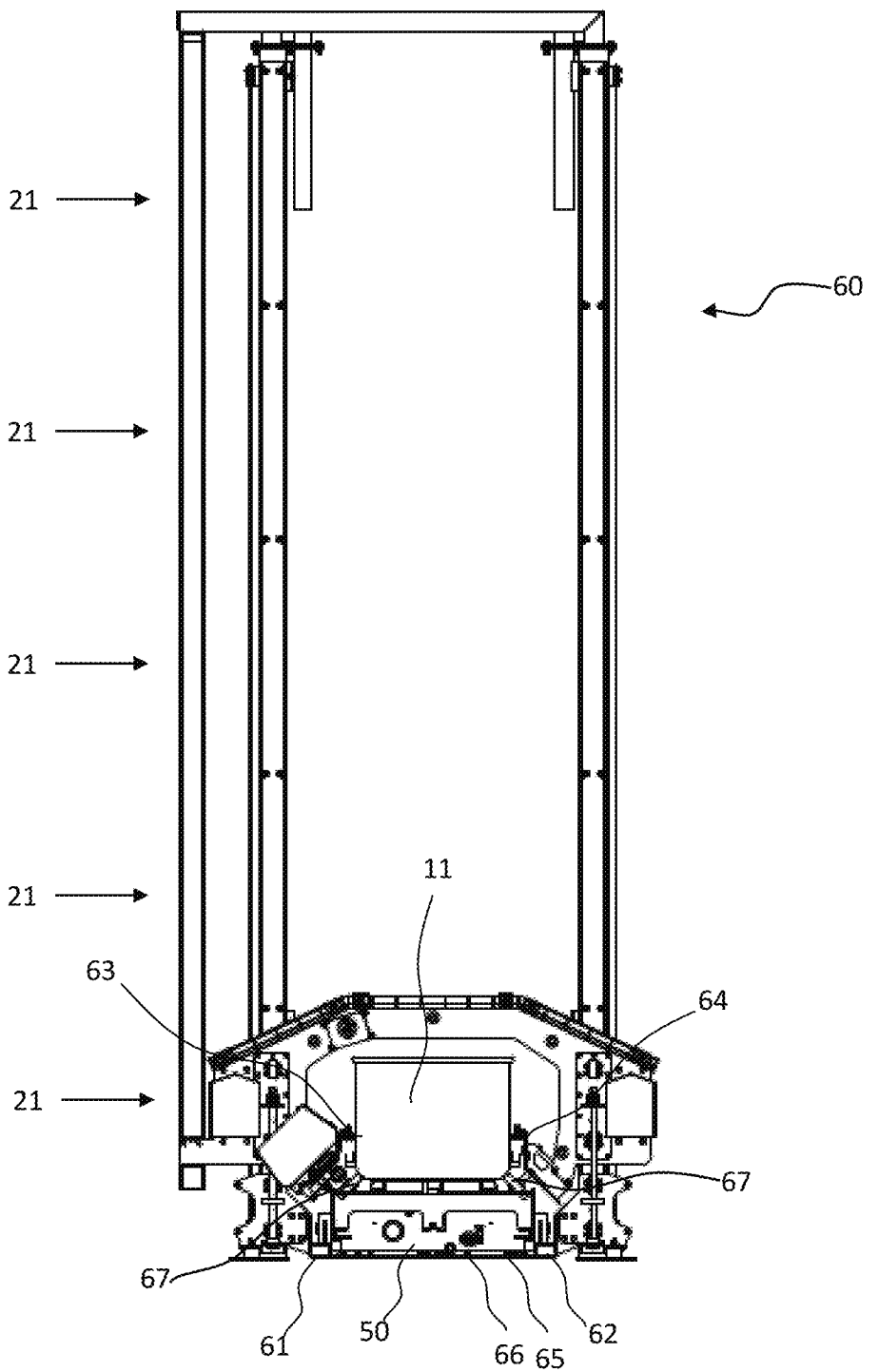
FIG. 5 illustrates a lifting device configured to the storage hack.

The FIG. 5 illustrates a lifting device 60. According to another embodiment of the invention, the automated storage 10 comprises a lifting device 60, that is configured to lift the storage bin 11 to any of the levels 21 o the storage rack 20.

The lifting device 60 comprises a floor 65, guides 61, 62 to receive the self-propelled satellite vehicle 50, lifting handles 63, 64 to lift the storage bin 11. The lifting device 60 may comprise rollers 67 to receive the storage bin. The rollers 67 are configured at an angle of approximately 45 degrees and the storage bin 11 is placed on the rollers 67 so that the rollers 67 support the storage bin 11 from the bottom side corners of the storage bin 11.

Figure 6:
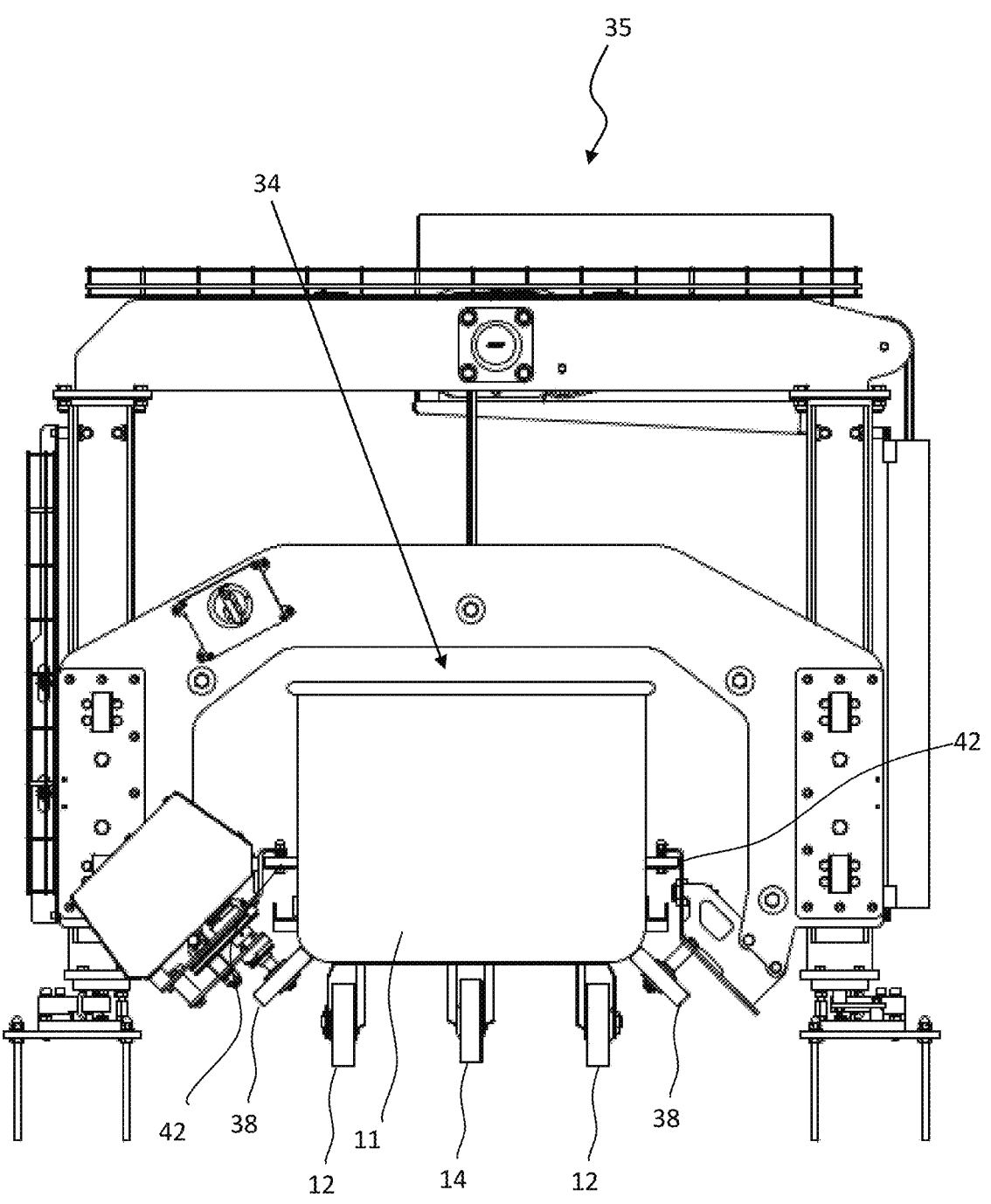
FIG. 6 illustrates the bin hoist, buffer conveyor and turn table.

The FIG. 6 illustrates a bin hoist 35. According to another embodiment of the invention, the automated storage 10 comprises a bin hoist 35, that is configured to receive a storage bin 11 e.g., from an operator so that the storage bin 11 is placed on the rollers 38 of the bin hoist 35. The rollers 38 are configured at an angle of approximately 45 degrees and the storage bin 11 is placed on the rollers 38 so that the rollers 38 support the storage bin 11 from the bottom side corners of the storage bin 11. Small rollers 42 guide the storage bin 11 from both sides in horizontal direction. The bin hoist 35 weighs the storage bin 11 and transmits the weight information to the control system 31. The bin hoist 35 lifts the storage bin 11 using the rollers 38*a*, 38*b* so that the rollers 38*a*, 38*b* are levelled with rollers 37*a*, 37*b* respectively of the buffer conveyor 36.

The FIGS. 7*a* and 7*b* illustrate a buffer conveyor 36. According to another embodiment of the invention, the automated storage 10 comprises a buffer conveyor 36 which comprises rollers 37*a*, 37*b* that are configured at an angle of approximately 45 degrees and the storage bin 11 is placed on the rollers 37*a*, 37*b* so that the rollers 37*a*, 37*b* support the storage bin 11 from the bottom side corners of the storage bin 11. Small rollers 43 guide the storage bin 11 from both sides in horizontal direction. The buffer conveyor 36 may be an accumulating conveyor such that it moves the storage bin 11 always next vacant position in the line of buffer conveyors 36. The buffer conveyor 36 carries the storage bin 11 at a height from main floor level. A brush system 45 may be placed at a location under the buffer conveyor 36 to brush the wheels 12,13, 14 and the bottom surface of the storage bin 11 in order cleanse the wheels 12,13, 14 and the bottom surface of the storage bin 11 and prevent impurity from dropping in the storage rack 20 from higher levels 21 on storage bins 11 stored at levels 21 below.

The FIG. 7*c* illustrates a brush system 45. According to another embodiment of the invention, the automated storage 10 comprises a brush system 45. The brush system 45 may be placed at a location under the buffer conveyor 36 essentially between the longitudinal sides of the buffer conveyor 36 as shown in FIG. 7*d*. The bush system 45 is advantageously placed at a location before the storage bin 11 is stored in the storage rack. 20 The brushes 44 of the brush system 45 are configured the cleanse the wheels 12, 13,14 of the storage bin 11, which is moving above the brush system 45 along the line of buffer conveyors 36 as shown in FIG. 2b.

Figure 8A:
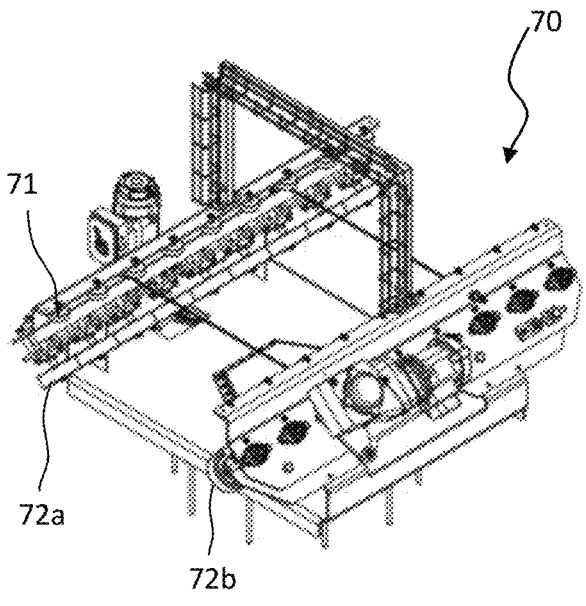
FIGS. 8a and 8b illustrate the turn table.
Figure 8B:
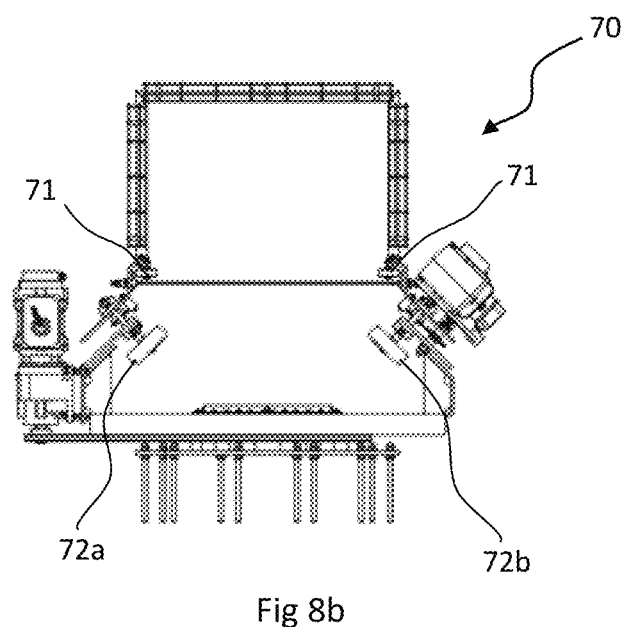

The FIGS. 8a and 8b illustrate a turn table 70. According to another embodiment of the invention, the automated storage 10 comprises a turn table 70 which comprises rollers 72a and 72b that are configured at an angle of approximately 45 degrees and reversed 45 degrees, respectively, and the storage bin 11 is placed on the rollers 72a, 72b so that the rollers 72a, 72b support the storage bin 11 from the bottom side corners of the storage bin 11. Small rollers 71 guide the storage bin 11 from both sides in horizontal direction. The turn table 70 can be rotated a number of degrees, typically about 90 degrees, to change the direction of motion of the storage bin 11.

According to an embodiment of the invention, there is an automated storage 10 comprising a storage rack 20 configured to store storage bins 11, a self-propelled shuttle vehicle 40, which is configured to move along the first horizontal direction of the storage rack 20 along a pair of mutually facing guides 25, 26. Also, there is a self-propelled satellite vehicle 50 configured to be carriable by the self-propelled shuttle vehicle 40 and configured to move along the second horizontal direction of the storage rack 20 essentially perpendicular against the first horizontal direction. The self-propelled satellite vehicle 50 is configured to carry storage bins 11 between the self-propelled shuttle vehicle 40 and the storage locations such that the self-propelled satellite vehicle 50 comprises at least one groove 52 on the top surface 51 of the self-propelled satellite vehicle 50 such that the parallelly fixed wheels 12 of the storage bin 11 can be set to the groove 52. By placing the storage bin 11 so that the parallelly fixed wheels 12 are set to the groove 51, the correct location and orientation of the storage bin 11 can be ensured. The storage rack 20 comprises a pair of mutually facing guides 27, 28 along the second horizontal direction wherein the self-propelled satellite vehicle 50 is configured to move on top of the pair of mutually facing guides 27, 28, the storage rack 20 comprises also a pair of mutually facing bars 29, 30 along the second horizontal direction essentially above said pair of mutually facing guides 27, 28 wherein the storage bins 11 are to be placed on top of the pair of mutually facing bars 29, 30. The self-propelled satellite vehicle 50 is capable of raising its top surface 51 and thus carrying the storage bin 11.

According to another embodiment of the invention, the storage rack 20 may comprise a number of levels 21. In this embodiment, the storage rack 20 may be equipped with a lifting device 60 configured to lift the storage bin 11 from ground level to plurality of levels 21. The lifting device 60 comprises a pair mutually facing guides 61, 62 configured to accommodate a self-propelled satellite vehicle 50 so that the self-propelled satellite vehicle 50 can enter the lifting device 60 along the pair of mutually facing guides 61, 62 and carry the storage bin 11 from the lifting device 60 into the self-propelled shuttle vehicle 40 and from self-propelled the shuttle vehicle 40 into the lifting device 60. The lifting device 60 comprises a first lifting handle 63 and a second lifting handle 64, wherein the first and second lifting handles 63, 64 are vertically movable with respect to the mutually facing guides 61, 62 respectively, and wherein the first and second lifting handles 63, 64 are configured to raise the storage bin 11 from the mutually facing guides 61, 62 to a distance essentially larger than the distance between the bars 29, 30 and the guides 27, 28 of the storage rack 20.

According to another embodiment of the invention, the self-propelled satellite vehicle 50 can travel in the lifting device 60 from a level to another level. In this embodiment the self-propelled satellite vehicle 50 can carry the storage bin 11 as described earlier.

According to another embodiment of the invention, the automated storage comprises a lifting device 60, wherein the floor 65 surface of the lifting device 60 comprises a groove 66. The storage bin 11 can be placed on the floor 65 of the lifting device 60 so that the parallelly fixed wheels 12 of the storage bin 11 are set to the groove 66 and prevent the storage bin 11 from rolling away.

The operation of the automated storage 10 can be described in three main activities:

Inputting a bin to the automated storage

Storing a bin in the storage

Retrieving a bin from the storage

During the input phase, a storage bin 11 is placed on the input conveyor, which brings the storage bin 11 to a bin hoist 35. The storage bin 11 maybe provided with a hood to protect the content of the storage bin 11 from possible contamination. The bin hoist 35 identifies the storage bin 11, e.g. using RFID identification (or 2D or 3D bar codes) and weighs the storage bin 11. The identification and weight information are transmitted to the control system 31, which transmits an acknowledge receipt of received information. The control system 31 assigns a position in the storage rack 20 for the storage bin 11. The storage bin 11 is then powered to buffer conveyor 36, which takes the storage bin 11 to the lifting device 60. A turn table 70 may be also placed between the buffer conveyor 36 and the lifting device 60 to enable changing the orientation of the storage bin 11 before lifting. The storage bin 11 is set on the floor 65 of the lifting device 60 so that the parallelly fixed wheels 12 of the storage bin 11 are placed on the groove 66 of the floor 65 of the lifting device 60.

During the storing phase, the lifting device 60 lifts the storage bin 11 by the lifting lugs 15 of the storage bin using the lifting handles 63, 64 of the lifting device 60 and brings the storage bin 11 to the targeted level. The floor 65 of the lifting device 60 is lowered with respect to the main structure of the lifting device 60 during the lifting. In the targeted level, the self-propelled satellite vehicle 50 enters then the lifting device 60 under the storage bin 11 so that the groove 52 in the top surface 51 of the self-propelled satellite vehicle 50 is placed in line with the parallelly fixed wheels 12 of the storage bin 11. The self-propelled satellite vehicle 50 then raises its top surface 51 and raises the storage bin 11 from the lifting handles 63, 64 of the lifting device 60. The self-propelled satellite vehicle 50 then enters the seat 41 of the self-propelled shuttle vehicle 40 carrying the storage bin 11. The self-propelled shuttle vehicle 40 then brings the self-propelled satellite vehicle 50 and the storage bin 11 to a targeted first aisle 24. The self-propelled satellite vehicle 50 then enters the first aisle 24 carrying the storage bin 11 and brings the storage bin 11 to assigned position in the first aisle 24. The self-propelled satellite vehicle 50 the lowers its top surface 51 and leaves the storage bin 11 at the assigned position in the storage rack 20 and returns to a position assigned by the control system 31 to wait from the next storage bin.

During the retrieval phase, an order is placed to the control system 31 to retrieve a desired storage bin 11. The self-propelled satellite vehicle 50 moves to the assigned position in the assigned first aisle 24 and raises the storage bin 11 from the storage rack 20 and brings the storage bin 11 to the self-propelled shuttle vehicle 40 and enters the seat 41 of the self-propelled shuttle vehicle 40. The self-propelled shuttle vehicle 40 brings the self-propelled satellite vehicle 50 to the lifting device 60. The self-propelled satellite vehicle 50 enters the lifting device 60 and lowers its top surface 51 and leaves the storage bin 11 on the lifting handles 63, 64 of the lifting device 60. The lifting device 60 brings the storage bin 11 on the floor level of the automated storage 10 to the buffer conveyor 36. The storage bin 11 is the removed from the buffer conveyor 36.

According to an embodiment of the invention, a first and a second lifting device 60, 68 respectively, are configured on two opposite sides of the storage rack 20 as shown in FIG. 2*b*. Also, each level 21 of the storage rack 20 comprises a second aisle 23 at said two opposite sides of the storage rack 20. The first lifting device 60 may be used for storing storage bins 11 to the storage rack 20 and the second lifting device 68 may be used for retrieving storage bins 11 from the storage rack 20. The automated storage 10 may be operated in First-In-First-Out (FIFO) manner so that when considering one first aisle 24 the storage bin, which was stored as the first item in said aisle will also be the first storage bin to be retrieved from the said aisle. A second buffer conveyor may be configured in proximity of the second lifting device 68, wherein the retrieved storage bins 11 are released from the buffer conveyor to a slightly tilted ramp 22, which is levelled at one end with the main floor.

According to an embodiment of the invention, a maintenance hoister is configured in proximity of the storage rack 20 configured to lift the self-propelled shuttle vehicle 40 from the storage rack 20 to the main floor for maintenance operations. The self-propelled shuttle vehicle 40 may carry the self-propelled satellite vehicle 50 during the lifting in order to bring the self-propelled satellite vehicle 50 on the main floor for maintenance operations. The self-propelled shuttle vehicle 40 may be configured with lifting lugs for enabling stable lifting of the self-propelled shuttle vehicle 40.

According to an embodiment of the invention, maintenance decks are configured on each level of the storage rack 20 in order to facilitate maintenance and washing operations of the automated storage 10. The automated storage may be configured to include a maintenance area for enabling lifting of the self-propelled shuttle vehicle 40 and the self-propelled satellite vehicle 50 on the main floor.

Figure 9:
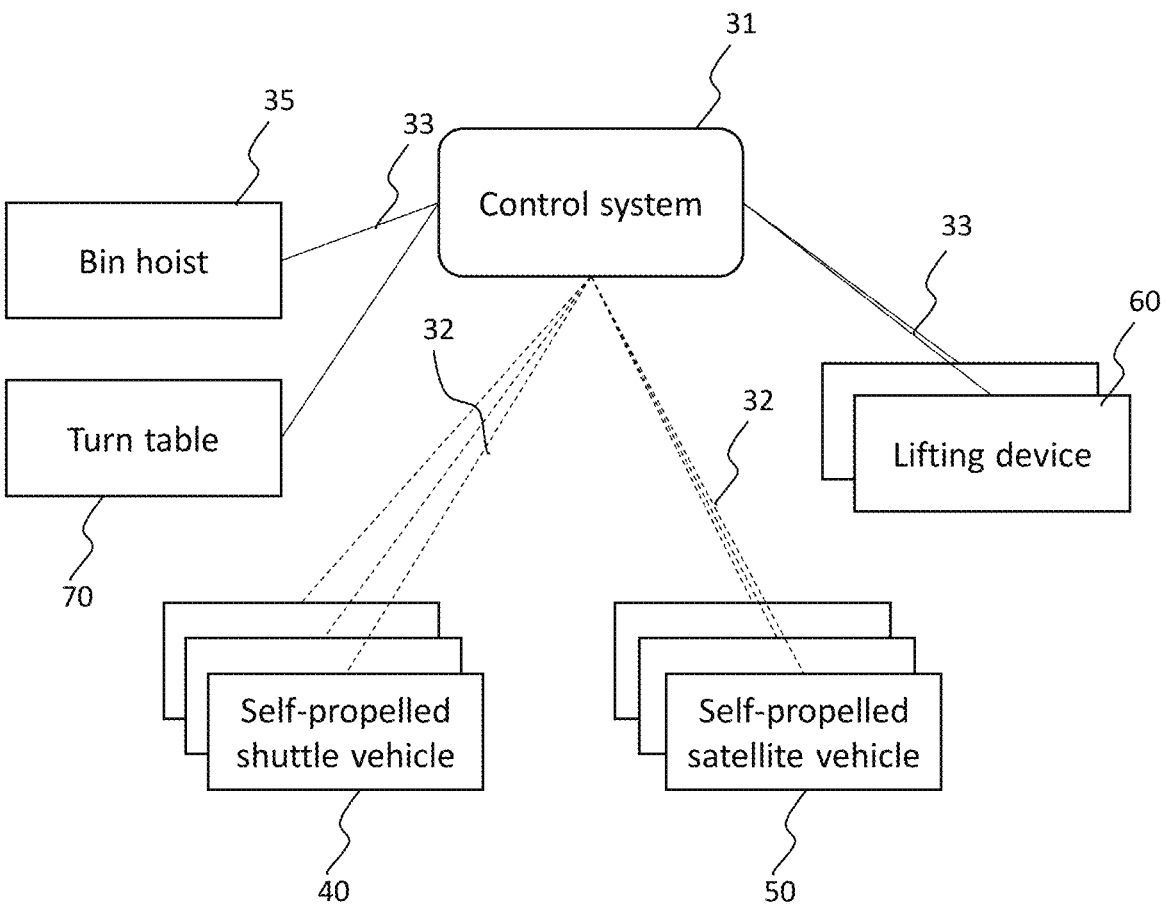
FIG. 9 illustrates schematically the control system and the automated storage.

Referring to FIG. 9, the control system 31 communicates wirelessly 32 (e.g. via Wifi) with the self-propelled shuttle vehicle 40, self-propelled satellite vehicle 50 and uses a wired 33 or wireless communication with the turn table 70, the bin hoist 35 and the lifting devices 60.

The control system 31 receives storage bin 11 identification and storage bin 11 weight information, assigns a position for each storage bin 11 in the storage rack, sends control commands to lifting device 60 to lift or lower storage bins 11, sends control commands to self-propelled shuttle vehicle 40 to move, sends control commands to self-propelled satellite vehicle 50 to move and carry storage bins 11

The bin hoist 35 identifies the bin and weighs the weight of the bin 11, and transmits the information to control system 31

The self-propelled shuttle vehicle 40 moves from its current position to the position assigned by control system 31

The self-propelled satellite vehicle 50 moves from its current position to the position assigned by control system 31, and picks or leaves storage bins 11 as commanded by control system 31

The lifting device 60 moves from its current level to the level assigned by control system 31

The disclosed automate storage can be configured and scaled to manage high number (e.g. thousands) of storage bins. The dimensions of the storage rack may be selected to adjust to the available facility. The dense structure of the automated storage enables efficient cooling of the storage facility. Also, the number of the lifting devices, self-propelled shuttle and satellite vehicles can be increased to improve throughput of the automated storage. The disclosed solution can handle the standardized storage bins equipped with freely rolling wheels in a reliable manner. The structures and surfaces of the storage rack 20, self-propelled shuttle vehicle 40, self-propelled satellite vehicle 50, lifting device 60, bin hoist 35, buffer conveyor 36, turn table 70 may be manufactured from stainless, non-corroding steel and manufactured with tight fitting/joints to enable high-pressure washing and maintaining the hygiene requirements.

The automated storage may also be configured to store Dolav type box palettes. In this case, the structure of the buffer conveyor, turn table and lifting device would be reconfigured to be able to receive and move/lift box palettes instead of storage bins equipped with wheels. Also, the dimensions of the mutually facing bars in the first aisles of the storage rack would need to be adjusted to receive box palettes.

It will be obvious to a person skilled in the art that, as the technology advances, the inventive concept can be implemented in various ways. The invention and its embodiments are not limited to the examples described above but may vary within the scope of the claims.

The invention claimed is:

1. An automated storage comprising:
   a storage rack configured to receive and store storage bins;
   a self-propelled shuttle vehicle configured to move along the first horizontal direction of the storage rack;
   a self-propelled satellite vehicle configured to be carriable by the self-propelled shuttle vehicle and configured to move along the second horizontal direction of the storage rack perpendicular against the first horizontal direction, wherein the self-propelled satellite vehicle is configured to carry a storage bin between the self-propelled shuttle vehicle and the storage position;
   a pair of mutually facing guides along the second horizontal direction wherein the self-propelled satellite vehicle is configured to move on top of the pair of mutually facing guides; and
   a pair of mutually facing bars along the second horizontal direction above the said pair of mutually facing guides, wherein the storage bin is to be placed on top of the pair of mutually facing bars by lifting lugs of the storage bin;
   wherein the self-propelled satellite vehicle comprises at least one groove on the top surface of the self-propelled satellite vehicle configured to receive the storage bin;
   wherein the storage rack comprises a plurality of levels;
   wherein the automated storage further comprises a lifting device configured to lift the storage bin from ground level to the plurality of levels; and
   wherein the lifting device comprises mutually facing guides configured to accommodate the self-propelled satellite vehicle, and a first and a second lifting handle, wherein the first and second lifting handles are vertically movable with respect to the mutually facing guides, and wherein the first and second lifting handles are configured to raise the storage bin from a floor of the lifting device to a distance larger than the height of the satellite vehicle.

2. The automated storage according to claim 1, wherein a surface of the floor of the lifting device comprises a groove.

3. The automated storage according to claim 1, wherein the floor of the lifting device is downward movable from the lifting handles of the lifting vehicle a distance larger than height of the satellite vehicle.

4. The automated storage according to claim 1, wherein the self-propelled satellite vehicle comprises on its top surface a first raised section on one side of the groove and a second raised section on the second side of the groove.

5. The automated storage according to claim 1, comprising a bin hoist configured to receive a storage bin to a seat, wherein the first side of the seat comprises rollers at 45 degree angle and rollers at a reversed 45 degree angle on the second side of the seat.

6. The automated storage according to claim 5, wherein the bin hoist comprises a weighing measure and a transmitter configured to transmit the information to a control system.

7. The automated storage according to claim 5, wherein the bin hoist comprises means for contactless identification of a storage bin and a transmitter configured to transmit the information to a control system.

8. The automated storage according to claim 1, comprising a buffer conveyor configured to receive a storage bin, wherein the first side of the buffer conveyor comprises rollers at 45 degree angle and rollers at a reversed 45 degree angle on the second side of the buffer conveyor.

9. The automated storage according to claim 8, wherein the buffer conveyor is configured to carry the storage bin at a height from the main floor and a brush system is configured between the sides of the buffer conveyor.

10. The automated storage according to claim 8, comprising a turn table configured to receive and turn a storage bin, wherein the first side of the turn table comprises rollers at 45 degree angle and rollers at a reversed 45 degree angle on the second side of the buffer conveyor.

\* \* \* \* \*